Nov. 6, 1928.
W. JOURDAN
1,690,449
METHOD FOR PREPARING FOOD PRODUCTS
Filed Aug. 21, 1925  3 Sheets-Sheet 1
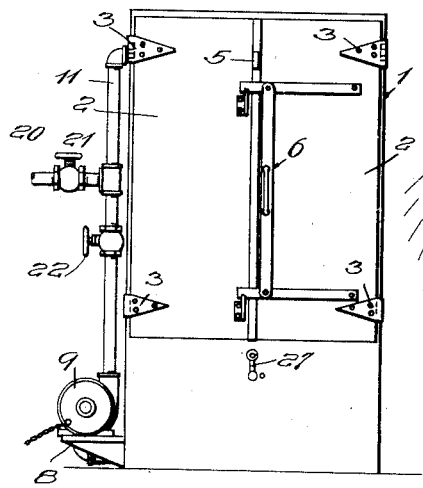
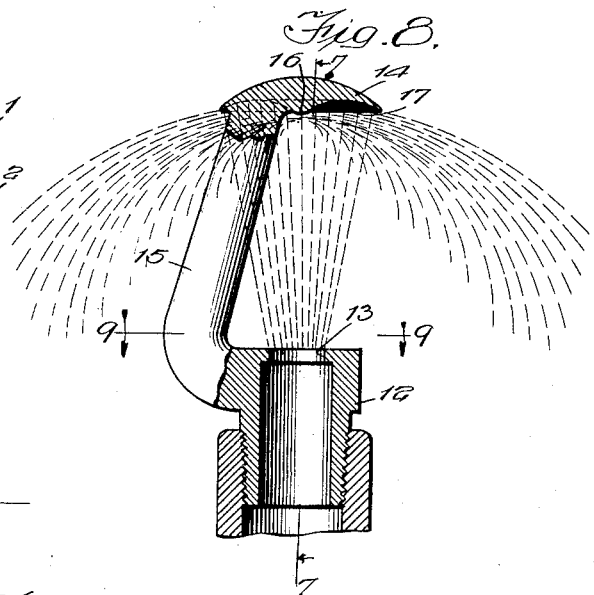
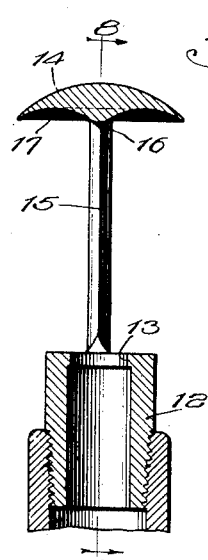
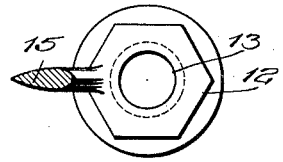
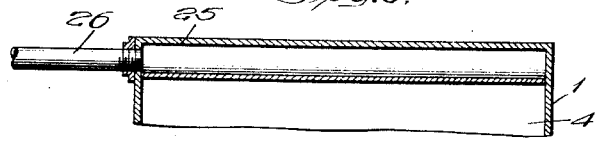
Witnesses:
William P. Kilroy
Harry A. L. White
Inventor:
William Jourdan
Edward Jay Wilson
By
Atty.

Nov. 6, 1928.
W. JOURDAN
1,690,449
METHOD FOR PREPARING FOOD PRODUCTS
Filed Aug. 21, 1925   3 Sheets-Sheet 2
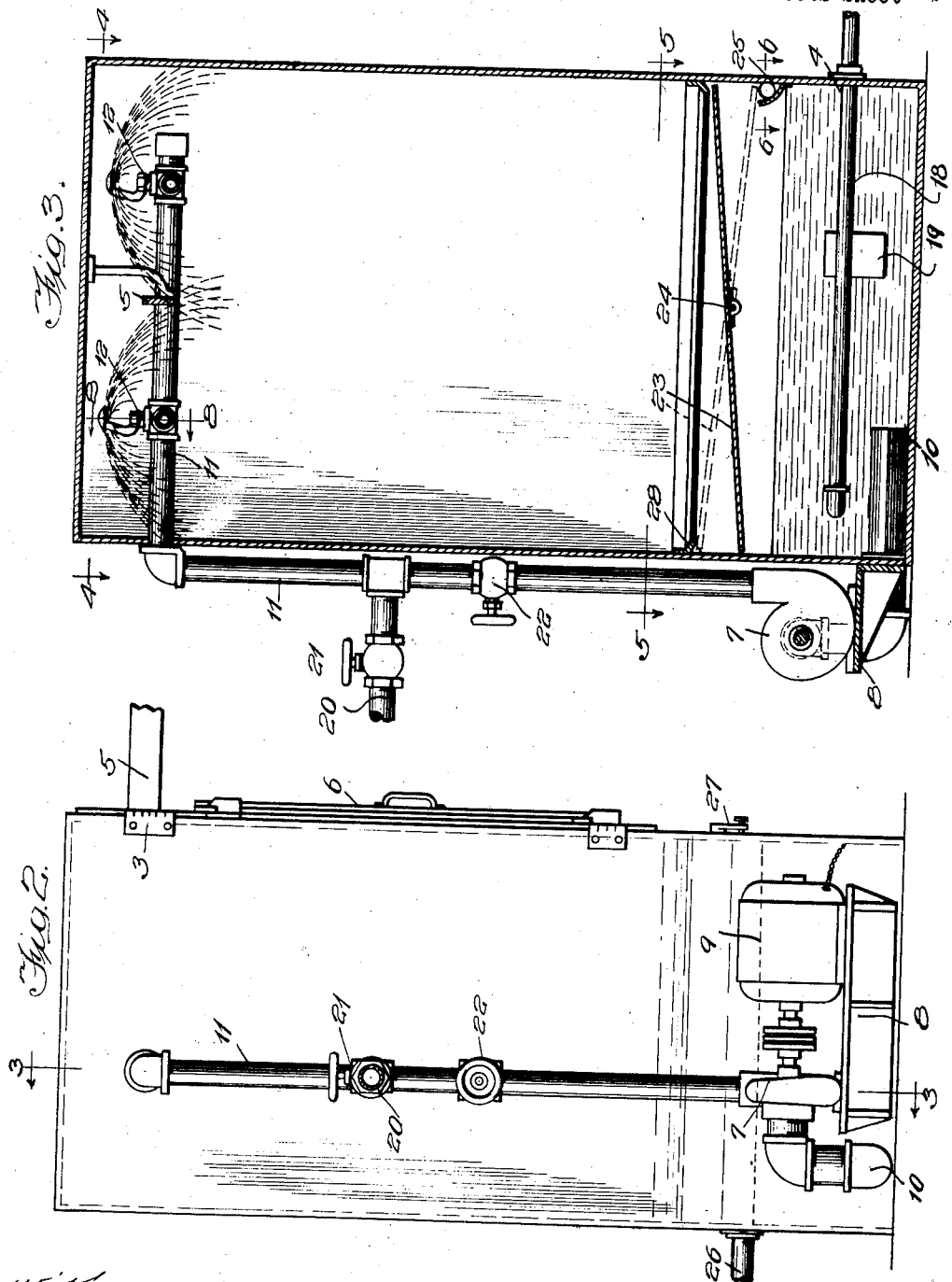

Nov. 6, 1928.

W. JOURDAN 1,690,449

METHOD FOR PREPARING FOOD PRODUCTS

Filed Aug. 21, 1925   3 Sheets-Sheet 3

Witnesses:
William P. Kilroy
Harry D. White

Inventor:
William Jourdan
Edward Fay Wilson
By         Atty.

Patented Nov. 6, 1928.

1,690,449

UNITED STATES PATENT OFFICE.

WILLIAM JOURDAN, OF CHICAGO, ILLINOIS.

METHOD FOR PREPARING FOOD PRODUCTS.

Application filed August 21, 1925. Serial No. 51,620.

My invention relates to improvements in methods of preparing food products and has special relation to improvements in processes of preparing such food products as meats particularly such meat products as are first partly cured or cooked by smoking.

The object of my invention is to simplify and reduce the cost of cooking such meat products as smoked sausages, weiner wurst etc., to more effectively and thoroughly tint or color such products, and thoroughly cleanse same from all adhering grease and other undesired substances.

A further object of my invention is to provide a method of cooking such products which have first been partly cured by smoking which shall not require any individual handling and by which the light colored spots or portions so prevalent on the products cooked by the old immersion method shall be eliminated.

My improved method comprises the provision of a cabinet adapted to receive a rack loaded with the sausages or other products, which can be fairly tightly closed, and the subjection of the products within the cabinet to a continuous shower or bath of hot water delivered preferably in large and spreading streams into the top of the cabinet. The water is collected in a water tight vat in the bottom of the tank and delivered back into the top of the cabinet. The coloring matter is dissolved in the water and is applied to the product on the rack by the water as it falls from the top of the cabinet over and in contact with the meat product.

My invention also contemplates the thorough washing of the food product with cold water after it has been subjected to the hot water and coloring treatment for a sufficient time. Means are provided for keeping the cold water used separate from the hot water in the cabinet.

My invention also consists in the simple means which I have provided for carrying out my improved method.

My invention will be more readily understood by reference to the accompanying drawings in which:

Fig. 1, is a front elevation of a cabinet particularly fitted up for the practice of my improved method;

Fig. 2, is a side elevation of the cabinet;

Fig. 3, is a vertical sectional view on the line 3—3 of Fig. 2;

Figure 4:
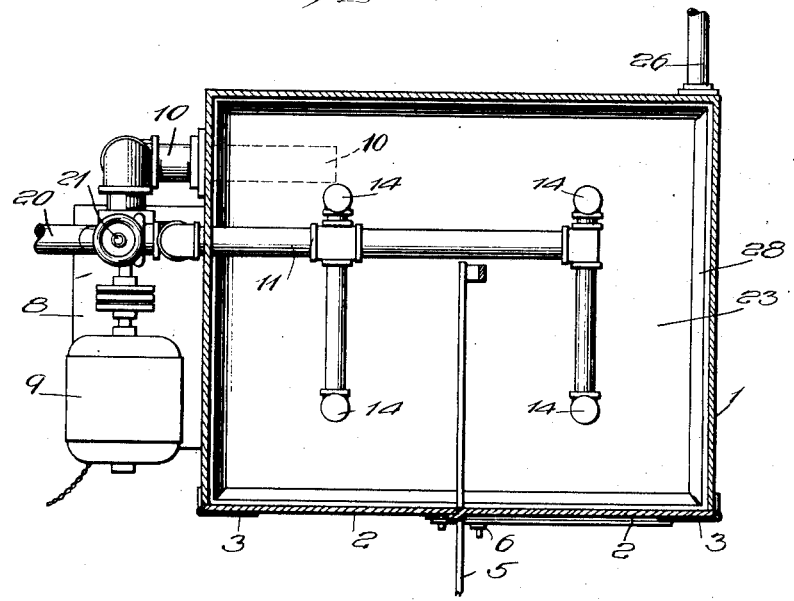
Figure 5:
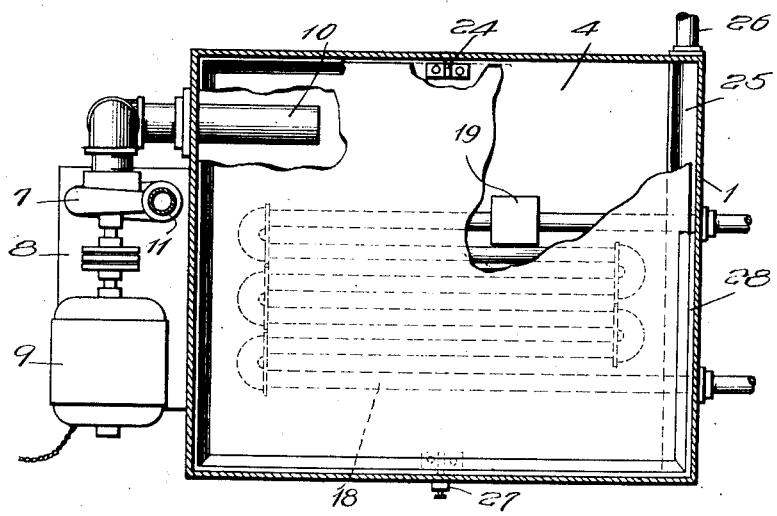

Figs. 4, and 5, are horizontal sectional views on the lines 4—4 and 5—5 respectively of Fig. 3;

Fig. 6, is a fragmentary horizontal sectional view on the line 6—6 of Fig. 3;

Fig. 7, is a vertical sectional view of one of the water discharge nozzles and taken on the line 7—7 of Fig. 8;

Fig. 8, is a vertical sectional view on the line 8—8 of Fig. 3; and

Fig. 9, is a horizontal sectional view on the line 9—9 of Fig. 8.

In said drawings 1 indicates a cabinet having doors 2 in one wall mounted on hinges 3 and adapted to be opened to expose the whole width of the cabinet from the top of the cabinet to a point near the bottom. The lower part of the cabinet, that is below the doors, is made tight to serve as a tank or reservoir 4 to contain water for use in the process.

A conveyor rail 5 enters the upper part of the cabinet at the joint between the doors, and upon which rail suitable racks loaded with the meat products to be subjected to the method can be readily entered into the cabinet. Usually the meat products are placed upon the rack and then placed in the smoking oven, they are then removed from the smoking oven and placed immediately in the cabinet to have the cooking completed.

The doors 2 are provided with suitable latch devices 6 by which they can be held closed after the rack has been placed in the cabinet. The cabinet is fairly tight though it is not necessarily pressure tight as the process does not include steam under pressure but vapor or water at atmospheric pressure.

The hot water which is used in the process is contained within the tank or sump 4 and there is provided a simple centrifugal pump 7 arranged on a suitable support 8 just outside the cabinet and adapted to be driven by any suitable means such as an electric motor 9 also mounted on the support 8.

The suction pipe 10 of the pump enters the lower part of the sump 4 and is adapted to take the water from a level below its top surface so that it does not take in the grease, fats or meat particles which may be floating on the surface of the water.

The delivery pipe 11 of the pump rises along side of the cabinet and enters below the top thereof about on the level of the rail 5. Within the top of the cabinet the delivery pipe 11 is branched and is provided with a plurality of outlets, in the present instance with four outlets. Each outlet has a spreading nozzle 12 which consists of a fitting having a relatively large discharge outlet 13 and a spreading baffle 14 arranged above the outlet. The baffle is mounted on an arm 15 rising from the fitting 12. The baffle is somewhat umbrella shaped except that it has a central depending spreading point 16 which provides a shallow spreading groove 17 well adapted to cause the water issuing from the discharge opening 13 below to spread out laterally and thoroughly and completely drench anything placed in the cabinet below the nozzles.

By "drench" or the "drenching" application of hot water to the meat products is meant the subjection of the products to the application of hot water in such a manner that the water is applied and substantially immediately removed as by a "drenching" downpour of hot water.

In the treatment of meat products of the kind contemplated it is usually desired that they be made of an inviting pink brown color particularly sausages. In order to provide this color, a suitable permissible coloring matter which can be carried in water is used. In the old immersion method in which the meat products are immersed in hot water the coloring was placed directly in the water and the placing and removal of the sausages kept it more or less evenly distributed but as in this old method the sausages were in close contact with each other, the coloring matter was prevented from getting to all portions of the surfaces of the sausages, with the result that they were not evenly and completely tinted.

In my improved method I place the coloring matter in the water and it is carried by the water to and upon the meat products which are hung free from each other upon the racks. Consequently all of the exterior surfaces of all of the sausages are evenly and completely tinted with the possible exception of the small spots where they contact with the rails of the rack by which they are supported but such small spots are negligible.

For the purpose of keeping the hot water at the proper temperature preferably slightly below or at boiling, there is provided a suitable steam coil 18 in the bottom of the reservoir 4 and which may be controlled as to temperature by a suitable thermostatic control indicated at 19.

By this means while the meat products are subjected to the action of the hot water flowing in ample quantities down over them and by which the coloring matter is applied, they are also subjected to the cooking action of the water vapor which completely fills the cabinet escaping as it does freely from the down pouring hot water. The result is that the usual run of sausages are completed in three or four minutes and without any of the arduous manual labor which is necessary in the common immersion system.

After the meat products have been thoroughly cooked and tinted it is desirable to cool them and to wash them with clean water. For this purpose the delivery pipe 11 of the pump is connected by a pipe 20 with a suitable supply of clean cold water which supply is controlled by a valve 21. The pipe 11 is controlled by a valve 22 between the connection with the cold water supply pipe 20 and the pump 7 so that when it is desired to run clean cold water through the nozzles the pump is stopped the valve 22 closed and the cold water supply valve 20 opened.

In order to prevent the cold water, used in washing and cooling the articles being treated, from mixing with and cooling the hot water in the sump I provide a deflector plate 23 in the lower part of the cabinet which is mounted on central bearings 24 so that it can be tilted down in one direction as shown in full lines, Fig. 3 or in the opposite direction as shown in dotted lines.

When tilted as shown in dotted lines the water falling down through the cabinet is directed into a drain gutter 25 on one side wall of the cabinet and a drain pipe 26 is connected at one end of the gutter to carry the water away. A handle 27 is provided on the front of the cabinet for tilting the deflector plate 23. In order to prevent the water running down the side walls of the cabinet past the deflector there is provided a drain ledge 28 extending all around the cabinet just above the deflector. This ledge also serves as a stop to limit the tilting of the deflector.

For using hot water from the sump the deflector is tilted as shown in full lines in Fig. 3 and by which the hot water is returned to the sump. In using cold water the deflector is tilted as shown in dotted lines and thereby the cold water is directed into the drain trough and removed from the cabinet.

As many modifications of my invention will readily suggest themselves to one skilled in the art I do not limit or confine my invention to the specific order of steps or to the specific details of construction herein shown and described.

I claim:—

1. The herein described method of preparing food products comprising, subjecting the products, in a substantially closed space, to the action of hot water directed upwardly and away from the products and permitted to fall upon the products in the form of a drenching down pour for a sufficient length of time to thoroughly cook same.

2. The herein described method of preparing food products comprising, arranging the products in a substantially closed space, directing hot water in such a manner that the water falls upon the products in drops of non-uniform size which strike the products at indeterminate points and continuing the application of the hot water for a sufficient time to thoroughly cook the products.

3. The herein described method of preparing food products comprising, arranging the products in a substantially closed space, directing hot water in such a manner that the water falls upon the products in drops of non-uniform size which strike the products at indeterminate points, and simultaneously subjecting the products to the action of hot water vapor until the products are cooked.

4. The herein described method of cooking meat products comprising, subjecting the products to the cooking action of hot water falling by gravity upon the products in a more or less finely divided state and by which the water does not strike the products at predetermined points, the hot water carrying with it suitable coloring matter for application to the products.

5. The herein described method of cooking meat products comprising, arranging the products in separated relation within a substantially closed space, causing hot water to fall by gravity in a more or less finely divided state upon the products at indeterminate points, the water carrying suitable coloring matter for application to the products.

6. The herein described method of preparing food products comprising, arranging the products in a substantially closed space, directing hot water in such a manner that the water falls upon the products in drops of non-uniform size which strike the products at indeterminate points, continuing the application of the hot water for a sufficient time to thoroughly cook the products, and before moving the products subjecting the products to a like action of relatively cold water to wash and cool the meat products.

7. The herein described method of cooking meat products, which consists in drenching the products with hot water and continuing the drenching application of the hot water until the products are cooked.

8. The herein described method of cooking meat products, which consists in drenching the products with hot water in the presence of hot watery vapor and continuing such application of the hot water and vapor until the products are cooked.

9. The herein described method of cooking meat products, which consists in arranging the products in a separated relation within a closed space, drenching the products with hot water, and continuing the drenching application of the hot water until the products are cooked.

10. The herein described method of cooking meat products, which consists in drenching the products with hot water, continuing the drenching application of the hot water until the products are cooked, and drenching the products with cold water to cool and wash same.

In testimony whereof, I have hereunto set my hand, this 8th day of August, 1925.

WILLIAM JOURDAN.